United States Patent

Hammer

[11] 4,061,519
[45] Dec. 6, 1977

[54] PROCESS FOR THE CONTINUOUS OVERLAP WELDING OF PLASTIC SHEETS OR PANELS

[75] Inventor: Heiner I. Hammer, Rosengarten, Germany

[73] Assignee: Schlegel Engineering GmbH, Hamburg, Germany

[21] Appl. No.: 763,505

[22] Filed: Jan. 28, 1977

Related U.S. Application Data

[63] Continuation of Ser. No. 581,244, May 27, 1975, abandoned.

[30] Foreign Application Priority Data

May 29, 1974 Germany .................. 2426154

[51] Int. Cl.² ................................................ B32B 31/00
[52] U.S. Cl. .................................. 156/244; 156/295; 156/322; 156/324
[58] Field of Search ............. 156/295, 244, 157, 309, 156/322, 324, 544, 550, 578, 499, 500, 71, 152, 306; 228/9, 103; 113/116 W

[56] References Cited

U.S. PATENT DOCUMENTS

| Re. 25,200 | 7/1962 | Robinson et al. | 156/550 X |
| 2,305,658 | 12/1942 | Andersen et al. | 156/322 X |
| 3,008,862 | 11/1961 | Haine et al. | 156/295 X |
| 3,166,458 | 1/1965 | Chinn et al. | 156/295 |
| 3,481,818 | 12/1969 | Wellen | 156/324 X |
| 3,505,143 | 4/1970 | Haas et al. | 156/244 X |
| 3,519,513 | 7/1970 | Wilharm | 156/295 X |
| 3,716,434 | 2/1973 | Cook et al. | 156/295 X |

Primary Examiner—Douglas J. Drummond
Assistant Examiner—Thomas Bokan
Attorney, Agent, or Firm—Bierman & Bierman

[57] ABSTRACT

Method for joining sheets or panels of polyolefin is provided in which a layer of additional material is placed between heated polyolefin sheets or panels to be joined; the additional material being heated to a temperature sufficient to impart a sufficient level of heat to the surfaces of the polyolefin sheets to permit effective welding of the sheets to the additional material through the medium of a continuously operating pressure applying device.

8 Claims, 4 Drawing Figures

PROCESS FOR THE CONTINUOUS OVERLAP WELDING OF PLASTIC SHEETS OR PANELS

This is a Rule 60 Continuation Application of copending U.S. Pat. Application, Ser. No.: 581,244, filed May 27, 1975 now abandoned, and which hereby claims the priority of German Application No.: P 24 26154.9-16 of May 29, 1974.

This invention relates to a process for the continuous overlap welding of thermoplastic sheets or panels by heating and compression of the facing overlapping surfaces, and to apparatus for performing said process.

In the overlapping welding of polyolefin sheets or panels, the overlapping edges or facing surfaces thereof are conventionally heated to above melting temperature and then pressed together until the seam has cooled to an extent such that it has stability of shape in respect of forces occurring after the welding operation. This process cannot be used if the surfaces for joining cannot be heated adequately or if the heat losses are such that the temperature of the surfaces to be joined drops below melting temperature after heating and before pressure is applied. An example of such unfavourable conditions is the welding of long seams of polyethylene panels of the large-format size used in thicknesses of about 3 mm, for example for waterproofing or large-area roof covering. Uneven thickness and varying positions of the sheet edges for heating in relation to the heating elements may result in uneven heating; fluctuating climatic conditions result in fluctuating cooling before welding. An uneven position of the sheet edges on the support surface, more particularly the ground, results in uneven pressure. An absolutely reliable weld seam cannot therefore be obtained with the known process.

The object of the invention, therefore, is to provide a process for the welding of the overlapping edges of thermoplastic sheets or panels which ensures high welding reliability even under uneven temperature conditions at the weld interface regardless of whether the sheet edges are in an uneven position.

According to the invention, additional material in the thermoplastic state is introduced between the preheated surfaces for joining. The effect of the additional material is to convey additional heat into the weld zone, the magnitude of the additional heat being accurately defineable because the amount and temperature of the additional material are very accurately adjustable by automatic machines. The temperature of the surfaces for joining is therefore no longer a decisive factor because the additional material heats these surfaces, if they have an inadequate temperature, and hence ensures proper welding. In some cases, therefore, it will no longer be necessary for the surfaces to be joined to be heated to a temperature above melting temperature provided that the heat originating from the pre-heating of said surfaces and that of the additional material is sufficient to raise the surfaces to the required temperature in the pressure zone.

The plastic additional material, preferably in strip form, is also able to make up for any departures from the parallel position of the surfaces for joining due to corrugations in the sheet edges or an uneven supporting surface.

It is known to weld plastic surfaces using additional material. However, in such cases the additional material is intended only to fill existing cavities, for example in the welding of V-seams. Since there are no cavities to be filled in the overlap welding of sheets or panels, and instead the facing surfaces can be directly heated to melting temperature and compressed, it was hitherto thought that the use of additional material was unnecessary. In the case of the invention, the additional material also performs a different function from the case of the welding of V-seams, since it does not serve to fill cavities but to convey heat.

The amount and the temperature of the additional material must be made sufficient. In other words, the amount of additional material at each weld seam must be sufficient for the required heat transport. In most cases, the thickness of the additional material (before compression) should be about 2 – 3 mm. Too thin a strip or string might cool too much before reaching the welding point. After compression, the thickness should generally be between 0.5 and 8 mm. The thickness of the additional material after compression, however, should not be, on average, above the thickness of the thinnest of the two sheets or panels for joining, since otherwise there might be excessive stresses. The thickness of the layer of additional material is preferably between one-third and two-thirds of the thickness of the thinnest of the sheets or panels.

In many cases the sheet or panel edges for welding are all the more difficult to handle, the more flexible they are. If, for example, a pressure roller is used to apply the working pressure, the roller may push up corrugations in front of itself if the edges for welding are of very flexible consistency, and these corrugations might result in creasing. This risk is intensified by the thermal expansion of the edges. Advantageously, therefore, according to the invention, when the overlapping surfaces for joining are heated, a cross-sectional zone of the overlap area is kept at moderate temperature before they are compressed. This cross-sectional zone remaining at moderate temperature is advantageously the weld area thickness zone remote from the surfaces for welding (namely the outer surfaces of the sheets). This ensures that this area retains a given strength although the surface of the weld is softened.

Although this principle of obtaining stability of the weld area in a continuous welding process by limited heating, may merit independent protection from the other features of the invention, it has been found that the careful and rapid heating of the weld area required for the purpose can be performed very advantageously if the heat is partially supplied by means of the additional material.

The working pressure is conventionally maintained until the weld seam has cooled to such an extent that it can resist any forces occurring after the welding operation. In the majority of cases of application of the invention the sheets or panels to be joined are fixed to varying degrees in position in some way or other outside the weld seam pressure device, for example by resting on a support. Since, however, stresses are inherent in the material and the said fixing is also uneven, forces which might act on the weld seam must be expected after the direct welding operation.

Experience heretofore has shown that it is therefore necessary to maintain the working pressure for a relatively long period and where a continuous process is applied this is synonymous with an appropriately long pressure zone. This applies particularly to the preferred applications for panels more than 2 mm thick. A long pressure zone, however, can be obtained only with difficulty where a continuous process is performed. A continuously operating apparatus would have to be provided with pressure elements of an appropriate length for this purpose and they would have to be in the form of pressure tracks, rails or the like for example, and if the support or foundation is uneven the action of such pressure devices would be fairly doubtful. Also, a pressure device of this kind would not be usable for non-rectilinear weld seams. According to an important feature of the invention, therefore, a pressure zone of this kind is dispensed with. The working pressure is removed before the additional material solidifies. Any forces exerted on the weld seam are thus intentionally given the opportunity of producing certain relative movements in the weld seam. In fact even small deformation of the weld seam can reduce the force peaks to a small residue which the still unset weld seam can withstand. To ensure that the deformation of the weld seam does not result in any damage, it is advantageous for the additional material to have a certain appreciable thickness after compression to ensure that sufficient deformation volume is available. Here again, the above-mentioned preferred values for the thickness have proved advantageous.

It has been found convenient to join the additional material substantially simultaneously to the two surfaces for joining. If the additional material is prematurely applied to one of the two surfaces and if such surface is cooler than the additional material, there is the risk of the additional material unilaterally giving up a considerable proportion of its heat and its temperature is then no longer sufficient to heat the other surface to melting. To this end, it is advantageous for the additional material to be supplied at a speed not greater than the speed of advance of the welding device. In this way the extruded material is clamped between the nozzle and the place at which the two surfaces are combined under the action of the pressure device.

To adjust to different conditions, the height of the nozzle can be adjustable during operation in order to ensure that if the sheets or panels or their support are corrugated the string of additional material always extends in the direction of the bisector of the angle formed by the surfaces for joining in front of the place where they are compressed. Surprisingly, the tendency to corrugation and creasing in the top edge can also be reduced as a result.

It has surprisingly been found that the seam strength is increased if the additional material is allowed to swell out of the space between the two surfaces for joining, at least on one side. A bead then forms along one edge of the sheet or panel.

An apparatus for performing the process is characterised in that a device for heating the surfaces for joining, an extruder with a nozzle for the additional material, said nozzle being passed between the surfaces for joining, and a pressure device are provided on a guide frame. The latter is provided with a continuously operating drive system, the speed of which is advantageously variable. The pressure device may be in the form of a roller, since, for the reasons mentioned hereinbefore, the pressure zone is not required to have an appreciable length. To ensure equal working pressure beneath the pressure roller, even in the case of an uneven support, with little constructional outlay, the guide frame may be provided with three bearer rollers, one of which is the pressure roller.

Since it may be important to introduce the minimum amount of additional material when performing the process according to the invention, in order to reduce the thermal stresses at the weld seam, it may be necessary to accurately control the heating of the surfaces for joining. Advantageously, therefore, the intensity of the heating of the surfaces for joining is controlled in dependence on the temperature of said surfaces. Since measurement of the temperature of the surfaces after heating is possible only with difficulty, in a preferred embodiment of the invention the temperature of the surfaces is measured before they are heated, the intensity of the heat supply for heating being controlled automatically or manually to a level according to the temperature detected. Electrical infra-red heaters can be controlled very easily, particularly since they have a heating capacity independent of any air movements (wind in the open air). On the other hand, hot-air heaters have the advantage that the hot air shields the surfaces to be heated and possibly also the string of additional material from the cold external air. According to the invention, therefore, the continuous use of an infrared heater and at least one hot-air nozzle disposed after the infrared radiator as considered in the direction of movement is advantageous.

The invention is explained hereinafter with reference to the drawing, which diagrammatically illustrates one advantageous exemplified embodiment. In the drawings.

Figure 1:
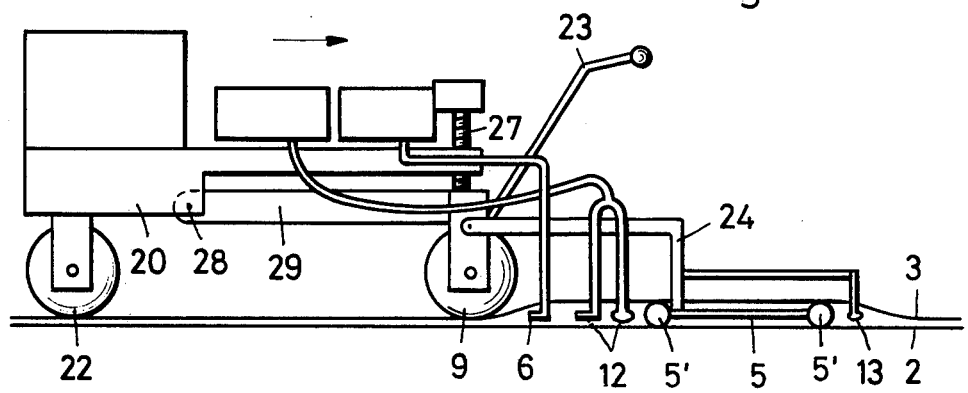
FIG. 1 is a general view of the welding device.

Referring now to the drawings, a sheet 2 which is to be welded to an overlapping sheet 3 rests on a support 1. It is assumed that the two sheets have a thickness of from 2.5 to 3 mm and consist of polyethylene. The welding device shown in FIG. 1 is adapted to travel along the overlap edge.

The welding device comprises a vehicle frame 20, at the rear end of which the wheels 22 are mounted about a rigid axle. The rear wheels 22 can be driven infinitely variably by a motor (not shown). A sub-frame 29 is articulated on the vehicle frame 28 and the front wheel 9 is mounted at its front end and can be steered by a steering rod 23. The front end of the frame 20 rests on the front end of the sub-frame 29 so as to be vertically adjustable by means of a spindle 27.

The essential machines of the device, which are shown only diagrammatically in the drawing, are situated on the vehicle frame, i.e., more particularly an extruder, for extruding in heated form the strip of additional material. a hot-air blower, control means, the said motor and, if required, further devices. The weight distribution is such that the device front wheel 9 is used as a pressure device and transmits the required weight to the weld seam so as to give a pressure of, for example 1.5 kg per square cm. By reason of the fact that the chassis is provided with three wheels and there is a relatively considerable distance between the wheels 22 and 9, the pressure remains constant independently of any ground irregularities.

If the pressure zone of a length of a few centimeters formed by the front wheel 9 is not sufficient, further pressure means can be provided after the front wheel 9 without difficulty.

Figure 3:
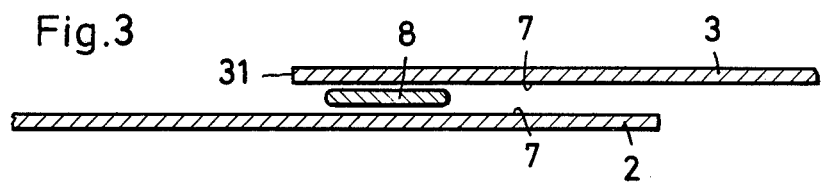
FIG. 3 is a cross-section through the weld zone before compression.

An extension 24 disposed in front of the front wheel 9 is articulated on the sub-frame and although it is vertically movable to yield to irregularities of the ground, it is guided on the vehicle sub-frame 29 so as to be laterally rigid. The front end of the extension 24 bears an infrared radiator 5 which radiates heat in the vertical direction as shown in FIG. 3. The radiator 5 is mobile on castors 5' which castors 5' also define the required distance between the overlapping surfaces which are to be interconnected. In addition, fingers 4 may be provided to lift the overlapping edge of the sheet 3. A temperature measuring device 13 extends from the infrared radiator 5 between the surfaces for connection and measures the surface temperature thereof in suitable known manner. Behind the infrared radiator are two hot-air nozzles 12 rigidly secured to the extension 24 and also extending between the overlapping surfaces. The front one of these two nozzles may be directed towards the surfaces requiring to be joined, while the rear one of the two nozzles generates a stream of hot air with a rearwardly directed component. The hot-air nozzles are connected to the hot-air blower on the vehicle frame.

The heating capacity of the infrared radiator and/or of the hot-air nozzles is adjusted by a control system which so operates in dependence on the results measured by the temperature measuring device 13 as to increase the heating capacity if the temperatures are found to be low and correspondingly decreases the heating capacity if the initial temperatures of the surfaces for connection are relatively high.

Figure 2:
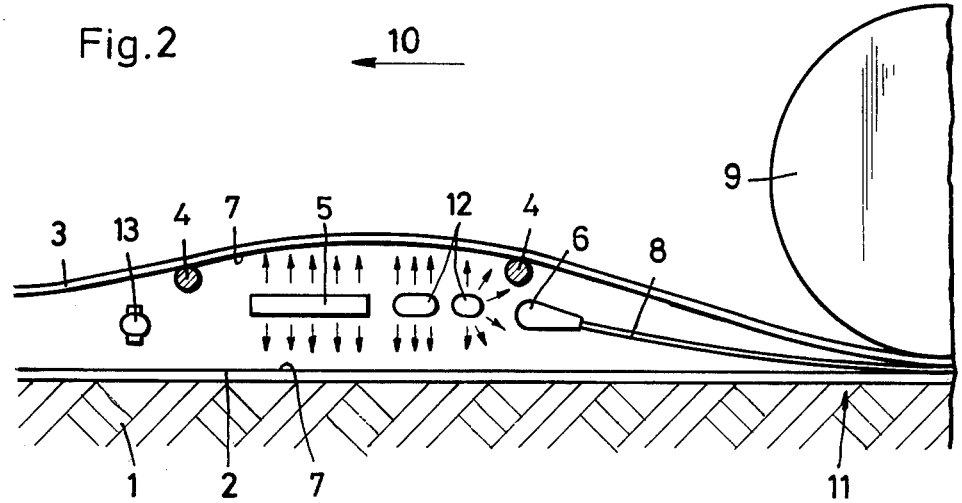
FIG. 2 is a longitudinal section through the weld zone.

The extruder nozzle 6 is situated between the hot-air nozzles 12 and the front wheel 9. It is so disposed on the vertically adjustable frame 20 as to produce a thin wide string 8 of the hot additional material between the surfaces to be joined, the material being such that it can form a welded connection with the two surfaces requiring to be joined. The vertical adjustability (with reference to ground in FIG. 2) of the front end of the frame 20 enables the nozzle 6 always to be kept in the middle between the surfaces for joining so that the string of additional material can uniformly enter at the angle formed in front of the pressure roller 9.

The surfaces 7 for joining are heated so intensively by the devices 5 and 6 that softening temperature is reached. In the case of polyethylene, for example, a surface temperature of 100° to 130° C should be reached. The heating capacity dependent upon the temperature measurement ensures that the required surface temperature is obtained in the zone 11 where the surfaces for connection and the additional material converge, even if the initial temperatures fluctuate, for example, under the influence of wind, different times of the day and different seasons and exposure to varying sunlight.

There is no likelihood of uneven and intensive cooling of the surfaces for joining and the string or strip of additional material between the hot-air nozzles 12 and the pressure zone 11, in view of the short length of this zone, which is only a few centimeters. Also, constant temperature conditions are ensured by the fact that the rearwardly directed second hot-air nozzle produces a shielding hot-air cloud around this zone. However, the sheet surfaces facing away from one another are cooled by radiation and convection so that their temperature is sufficiently far away from softening point. This prevents any undesired corrugation of the overlapping sheet edges. Any corrugations already existing in the sheet edges can be extensively equalised, this being promoted more particularly by the vertical adjustability of the extruder nozzle.

Figure 4:
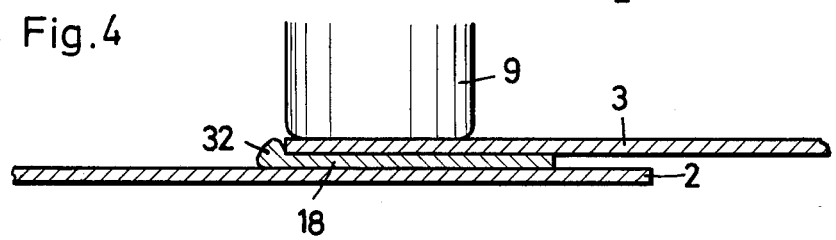
FIG. 4 is a similar cross-section to FIG. 3 after compression.

A rate of advance of 0.3 to 0.6 m per min. is used, for example, for welding 2.5 – 3 mm thick polyethylene panels. The extruded string 8 has a thickness of 2 – 3 mm and a width of about 4 cm. Its thickness should be more than the thickness of the layer 18 of additional material finally required in the weld seam (FIG. 4). The additional material is squeezed to the required thickness beneath the pressure roller 9, any variations in spacing between the surfaces 7 being equalized. Preferably, the additional material is squeezed out in the form of a bead 32 beyond the edge 31 of the top sheet 3 and this bead partially joins to the surface 7 of the sheet 2 and partially to the end face 31 of the sheet 3. These connections do not need to be constant in size to give the strength increase which is obtained as a result.

Many modifications in and to the above-described embodiments may occur to those skilled in the art. It is intended to cover all such modifications which fall within the spirit and scope of the claims appended hereto.

I claim:

1. In a process for the continuous overlap welding of thermoplastic sheets or panels on the ground by heating and compressing the facing overlapped sheets, comprising the steps of placing the sheets or panels to be welded on the ground in side by side position, overlapping the edges of adjacent sheets or panels and maintaining one edge on the ground, lifting the overlapped edge of the upper sheet or panel and placing a preheating means between the sheets or panels in the region of said overlapped edges, controlling the location of the preheating means between the said overlapped edges in accordance with the unevenness of the ground in the area of preheating and preheating the said overlapped edges to the softening point thereof, extruding additional material between the preheated overlapped edges while the edges are apart, heating the additional material into the thermoplastic state at least high enough to maintain a sufficient level of heat in said overlapped edges to permit the bonding of said edges to said additional material, and controlling the placement of said additional material such that said additional material contacts both edges substantially simultaneously, and applying pressure to press the overlapped edges against the ground to weld said sheets or panels to said additional material and thereby to each other.

2. The process according to claim 1 comprising the step of compressing said additional material between said edges to form a layer having a thickness at least one-third as thick as the thinner of said edges.

3. The process according to claim 2 comprising the step of removing the pressure resulting from compressing prior to the solidification of said additional material.

4. The process according to claim 1 wherein the step of compressing comprises the step of selecting a pressure to be applied so that the residual mean thickness of said additional material after pressure is removed is not substantially greater than the residual thickness of one of said sheets or panels.

5. The process according to claim 1 wherein the step of preheating said overlapping edges further comprises the step of keeping the heat supplied between said overlapping edges sufficiently low to prevent corrugation of said overlapping edges during compressing.

6. The process according to claim 5 further comprising the step of measuring the temperature of the region between said overlapping edges prior to heating and accordingly controlling the temperature of the preheating means to obtain sufficient preheating for preheating the edges to a softening point sufficiently low to prevent corrugation of the overlap region during pressure application.

7. The process according to claim 1 comprising the step of allowing the additional material to swell out from between said edges on at least one side thereof after joining.

8. The process according to claim 1 wherein the step of providing said additional material substantially in simultaneous contact with said edges further comprises the step of providing said additional material along the bisector of an angle generated by said edges from the point where the edges are compressed.

* * * * *